(12) United States Patent
Ma et al.

(10) Patent No.: US 9,342,604 B2
(45) Date of Patent: May 17, 2016

(54) COLLABORATIVE SEARCH

(75) Inventors: Chun E. Ma, Beijing (CN); Xincheng Mao, Beijing (CN); Li Yi, Beijing (CN); Jun Zhang, Beijing (CN)

(73) Assignee: International Business Machines Corporation, Armonk, NY (US)

(*) Notice: Subject to any disclaimer, the term of this patent is extended or adjusted under 35 U.S.C. 154(b) by 1360 days.

(21) Appl. No.: 12/547,766

(22) Filed: Aug. 26, 2009

(65) Prior Publication Data

US 2010/0057726 A1 Mar. 4, 2010

(30) Foreign Application Priority Data

Aug. 27, 2008 (CN) .......................... 2008 1 0146364

(51) Int. Cl.
   *G06F 17/30* (2006.01)
(52) U.S. Cl.
   CPC .... *G06F 17/30867* (2013.01); *G06F 17/30424* (2013.01); *G06F 17/3053* (2013.01); *G06F 17/30699* (2013.01)
(58) Field of Classification Search
   CPC .......... G06F 17/30867; G06F 17/3053; G06F 17/30424; G06F 17/30699
   USPC ................................................. 707/706, 751
   See application file for complete search history.

(56) References Cited

U.S. PATENT DOCUMENTS

| | | | | |
|---|---|---|---|---|
| 6,986,712 B1* | 1/2006 | Ogawa | ............................ | 463/42 |
| 7,779,370 B2* | 8/2010 | Mavinkurve et al. | .......... | 715/864 |
| 7,925,620 B1* | 4/2011 | Yoon | .................... | G06Q 10/109 |
| | | | | 707/609 |
| 8,639,214 B1* | 1/2014 | Fujisaki | ................. | G06Q 20/32 |
| | | | | 379/88.03 |
| 2003/0144996 A1* | 7/2003 | Moore, Jr. | ........................ | 707/3 |
| 2004/0203598 A1* | 10/2004 | Aerrabotu | .......... | G06Q 20/3674 |
| | | | | 455/411 |
| 2005/0144162 A1* | 6/2005 | Liang | ................ | G06F 17/30109 |
| 2006/0235873 A1* | 10/2006 | Thomas | ........................ | 707/102 |
| 2006/0248062 A1* | 11/2006 | Libes et al. | ...................... | 707/3 |
| 2006/0294476 A1* | 12/2006 | Buckley | ........................ | 715/781 |
| 2007/0067272 A1* | 3/2007 | Flynt et al. | ........................ | 707/3 |
| 2007/0257982 A1* | 11/2007 | Luo | .................... | H04M 1/72533 |
| | | | | 348/14.05 |
| 2007/0266384 A1* | 11/2007 | Labrou | ..................... | G06F 8/00 |
| | | | | 718/100 |
| 2007/0271234 A1* | 11/2007 | Ravikiran | ......... | G06F 17/30194 |
| 2008/0005668 A1* | 1/2008 | Mavinkurve et al. | ......... | 715/526 |
| 2008/0009268 A1 | 1/2008 | Ramer et al. | | |
| 2008/0009272 A1* | 1/2008 | Toledano | ............ | G06F 17/3089 |
| | | | | 455/414.1 |
| 2008/0148052 A1* | 6/2008 | Lindsley | ............... | H04L 9/3263 |
| | | | | 713/169 |
| 2009/0094224 A1* | 4/2009 | Ricket et al. | ...................... | 707/5 |
| 2009/0249071 A1* | 10/2009 | De Atley | ............ | G06F 21/6218 |
| | | | | 713/171 |
| 2009/0298461 A1* | 12/2009 | O'Reilly | ........... | H04M 1/72572 |
| | | | | 455/404.2 |
| 2009/0305699 A1* | 12/2009 | Deshpande | ........... | H04W 48/16 |
| | | | | 455/434 |
| 2010/0029302 A1* | 2/2010 | Lee | ........................ | H04W 4/02 |
| | | | | 455/456.6 |

OTHER PUBLICATIONS

Freyne, Jill, et al., "Further Experiments on Collaborative Ranking in Community-Based Web Search," Kluwer Academic Publishers (2004).

* cited by examiner

*Primary Examiner* — Thanh-Ha Dang
(74) *Attorney, Agent, or Firm* — Jeffrey T. Holman (57) ABSTRACT

A collaborative search is disclosed. The collaborative search includes receiving a search request of a mobile terminal. Searching based on the search request to obtain search results. Obtaining a relationship list associated with an identifier of the mobile terminal. Obtaining search history information associated with members in the relationship list based on the relationship list and ranking the search results based on the search history information.

18 Claims, 6 Drawing Sheets

COLLABORATIVE SEARCH

FIELD

Embodiments of the invention relates to the field of collaborative search, and particularly, to a collaborative search method, computer program product, and system.

BACKGROUND

At present, in order to accurately find the search results desired by a user, a search engine normally tracks the user's identity. For example, in some search systems, a search engine requires a user to first register his/her user information in a database. In some other search systems, a search engine requires a user to first create interest groups so as to identify the relationships among users.

However, because different search systems have respective search engines and databases, it is necessary for a user to register or create interest groups in each of the databases of the search systems. Normally, in order to improve the accuracy of searching, it is necessary for a user to explicitly enter his/her personal information when registering or explicitly describe interest groups when creating the interest groups. For a user, this is particularly troublesome. Further, it is necessary for a user to first logon when searching with the above search system each time, so that the search system can identify the user. For a user, this is particularly troublesome, too.

US patent application publication US 2008/0009268 published on Jan. 10, 2008 discloses a method for displaying only authorized mobile content on a communication device, which is hereby incorporated as reference herein.

US patent application publication US 2006/0235873 published on Oct. 19, 2006 discloses a social network-based internet search engine, which is hereby incorporated as reference herein.

The article of "Further Experiments on Collaborative Ranking in Community" by Jill Freyne, Barry Smyth, Maurice Coyle, Evelyn Balfe and Peter Briggs—Artificial Intelligence Review, Volume 21, Issue 3-4 (June 2004), Pages: 229-252, Year of Publication: 2004, ISSN:0269-2821 discloses a method of using context in a Web search so as to personalize the results of a generic search engine for the needs of a specialist community of users, which is hereby incorporated as reference herein.

Normally, a search engine of prior art does not take the relationships among users into consideration when ranking the search results. For example, in a case where user A is a colleague of user B, it is more likely that the search results selected by the user A are also those desired by the user B. However, in the prior art, a search engine will not take the relationships between user A and user B into consideration to rank the search results.

Currently, the performance of a mobile terminal such as mobile phone, PDA, iPhone™ and so on is becoming more and more powerful. For example, a mobile terminal can have functions such as network-browsing and so on. Many users can search information via a mobile terminal. A mobile terminal has many features that are different from those of a traditional fixed networking terminal.

SUMMARY

According to one embodiment of the invention, there is provided a collaborative search method comprising: receiving a search request of a mobile terminal; searching based on the search request to obtain search results; obtaining a relationship list associated with an identifier of the mobile terminal; obtaining search history information associated with members in the relationship list based on the relationship list; and ranking search results based on the search history information.

BRIEF DESCRIPTION OF THE DRAWINGS

The accompanying drawings, which are incorporated in and constitute a part of the specification, illustrate embodiments of the invention.

The embodiments of the invention will be more apparent according to the following detailed description with reference to the drawings.

DESCRIPTION OF THE EMBODIMENTS

Various exemplary embodiments of the present invention will now be described in detail with reference to the drawings. It should be noted that the relative arrangement of the components and steps, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Techniques, methods and apparatuses as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed for following figures.

Figure 1:
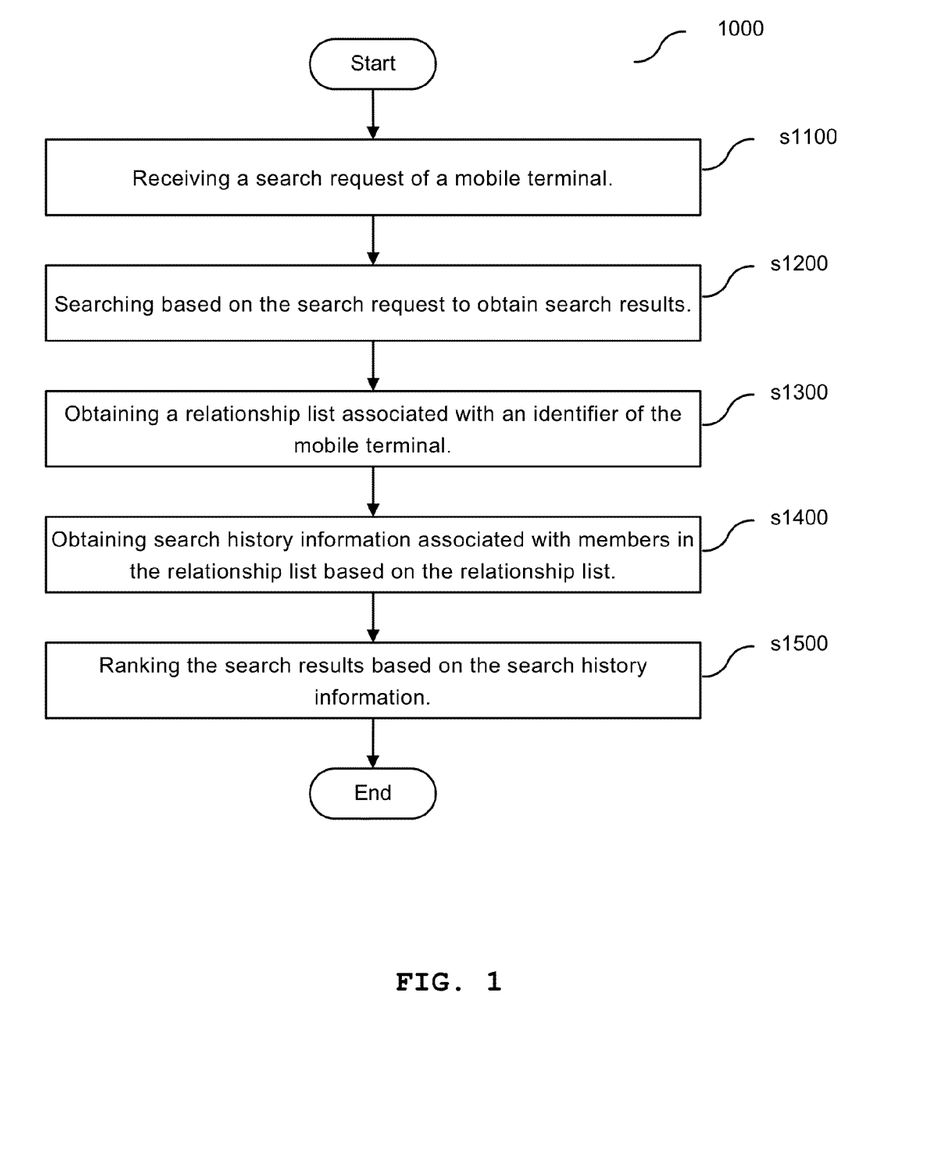
FIG. 1 is a flowchart showing a collaborative search method according to an embodiment of the invention.

FIG. 1 is a flowchart showing a collaborative search method 1000 according to an embodiment of the invention.

As shown in FIG. 1, at step s1100, a collaborative search system receives a search request of a mobile terminal.

The mobile terminal is, for example, a mobile phone, PDA, iPhone™ and so on.

The search request contains a query word of a user. Furthermore, the search request also contains an identifier of the mobile terminal. For example, the identifier of the mobile terminal can be a mobile phone number of the mobile terminal.

At step s1200, the collaborative search system makes a search based on the search request to obtain search results.

At step s1300, the collaborative search system obtains a relationship list associated with the identifier of the mobile terminal.

In an example, the mobile terminal sends a contact list and/or call records stored in the mobile terminal to the collaborative search system. For example, the mobile terminal sends a contact list and/or call records stored in the mobile terminal to the collaborative search system while sending the search request. The collaborative search system obtains the contact list and/or call records as a relationship list associated with the identifier of the mobile terminal.

In another example, the collaborative search system first extracts the identifier of the mobile terminal from the search request of the mobile terminal. Then, the collaborative search system sends the extracted identifier to a telecommunication service operator server. The telecommunication service operator server retrieves the call records of the mobile terminal based on the identifier, and sends the call records of the mobile terminal to the collaborative search system. The collaborative search system obtains the call records as the relationship list associated with the identifier of the mobile terminal.

It will be appreciated by a person skilled in the art that the collaborative search system can obtain the relationship list by using either and/or both of the ways in the above examples.

Further, the collaborative search system can store the relationship list, and update the relationship list each time when obtaining the relationship list from a mobile terminal and/or a telecommunication service operator.

Further, the collaborative search system can request a mobile terminal to send its relationship list to the collaborative search system at a predetermined time interval (for example, one week, one month and so on), so as to update the relationship list stored in the collaborative search system.

At step s1400, the collaborative search system obtains search history information associated with members in the relationship list based on the relationship list.

The collaborative search system contains a search history information repository for storing search history information associated with identifiers. The collaborative search system obtains the search history information from the search history information repository based on the identifiers in the obtained relationship list.

At step s1500, the collaborative search system ranks the search results based on the search history information. For example, if there is a same item in the search results as that in the search history information, this item will be ranked higher in the ranking.

Figure 2:
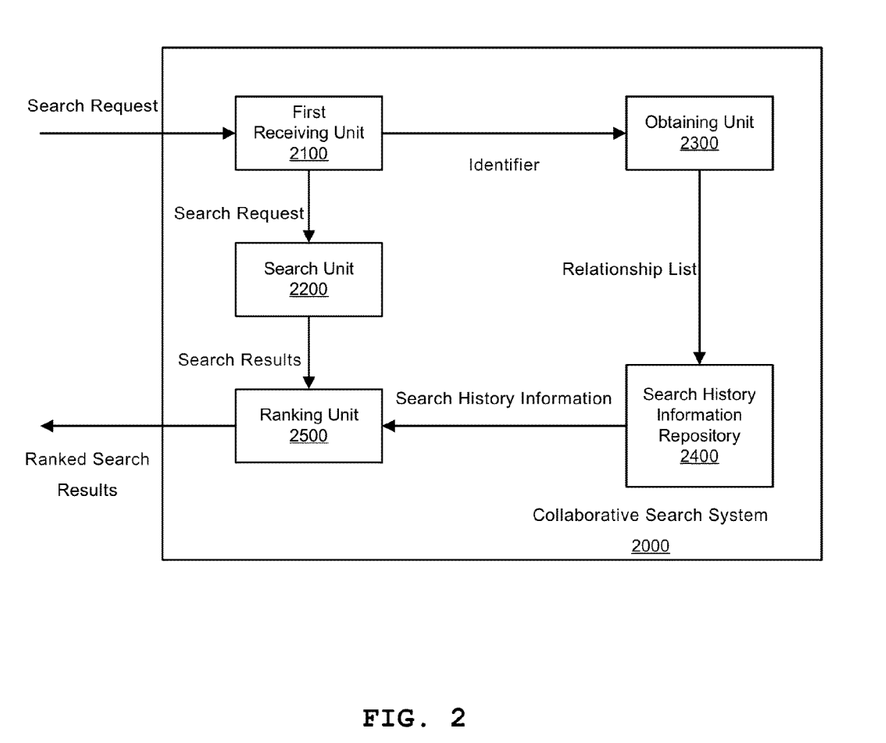
FIG. 2 is a block diagram showing a collaborative search system according an embodiment of the invention.

FIG. 2 is a block diagram showing a collaborative search system 2000 according to an embodiment of the invention.

The collaborative search system 2000 comprises: a first receiving unit 2100, a search unit 2200, an obtaining unit 2300, a search history information repository 2400 and a ranking unit 2500.

As shown in FIG. 2, the first receiving unit 2100 receives a search request of a mobile terminal.

The mobile terminal is, for example, a mobile phone, PDA, iPhone™ and so on.

The search request contains a query word of a user. Furthermore, the search request also contains an identifier of the mobile terminal. For example, the identifier of the mobile terminal can be a mobile phone number of the mobile terminal.

The search unit 2200 makes a search based on the search request to obtain search results.

The obtaining unit 2300 obtains a relationship list associated with the identifier of the mobile terminal.

In an example, the mobile terminal sends a contact list and/or call records stored in the mobile terminal to the collaborative search system. For example, the mobile terminal sends a contact list and/or call records stored in the mobile terminal to the collaborative search system while sending the search request. The obtaining unit 2300 obtains the contact list and/or call records as a relationship list associated with the identifier of the mobile terminal.

In another example, the obtaining unit 2300 first extracts the identifier of the mobile terminal from the search request of the mobile terminal. Then, the obtaining unit 2300 sends the extracted identifier to a telecommunication service operator server. The telecommunication service operator server retrieves the call records of the mobile terminal based on the identifier, and sends the call records of the mobile terminal to the obtaining unit 2300. The obtaining unit 2300 obtains the call records as the relationship list associated with the identifier of the mobile terminal.

It will be appreciated by a person skilled in the art that the obtaining unit 2300 can obtain the relationship list by using either and/or both of the ways in the above examples.

Further, the obtaining unit 2300 can store the relationship list, and update the relationship list each time when obtaining the relationship list from a mobile terminal and/or a telecommunication service operator.

Further, the obtaining unit 2300 can request a mobile terminal to send its relationship list to the obtaining unit 2300 at a predetermined time interval (for example, one week, one month and so on), so as to update the relationship list stored in the obtaining unit 2300.

The search history information repository 2400 obtains search history information associated with members in the relationship list based on the relationship list.

The search history information repository 2400 is used to store search history information associated with identifiers. The search history information repository 2400 receives the relationship list from the obtaining unit 2300, and provides the search history information based on the identifiers in the obtained relationship list.

The ranking unit 2500 ranks the search results based on the search history information from the search history information repository 2400. For example, if there is a same item in the search results as that in the search history information, this item will be ranked higher in the ranking.

Figure 3:
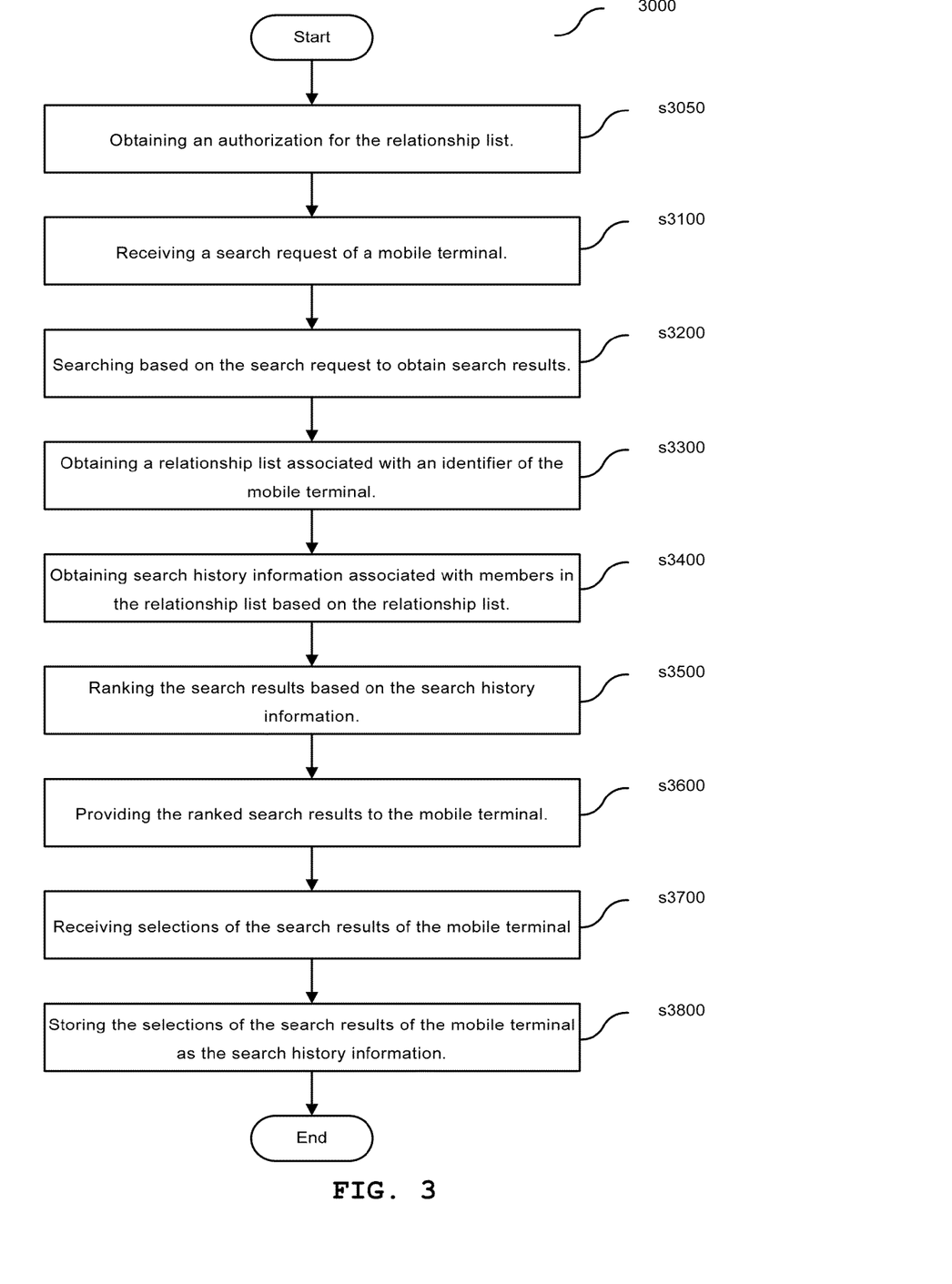
FIG. 3 is a flowchart showing a collaborative search method according to an embodiment of the invention.

FIG. 3 is a flowchart showing a collaborative search method 3000 according to an embodiment of the invention.

As shown in FIG. 3, at step s3050, a collaborative search system obtains an authorization for accessing a relationship list of a mobile terminal. The mobile terminal is, for example, a mobile phone, PDA, iPhone™ and so on.

In an example, the collaborative search system merely needs the relationship list from the mobile terminal. Thus, it is merely necessary for the mobile terminal (or its user) to authorize the collaborative search system to access the relationship list in the mobile terminal.

In another example, the collaborative search system needs a relationship list from a telecommunication service operator. In this case, the mobile terminal (or its user) authorizes the telecommunication service operator to provide the relationship list to the collaborative search system.

For example, the user of the mobile terminal can go to the business hall of the collaborative search system to sign an authorization agreement to authorize the collaborative search system to access its relationship list.

Alternatively, for example, when a user applies for a collaborative search service through a mobile terminal, the collaborative search system sends an authorization agreement to the mobile terminal. For example, the authorization agreement is digitally signed by the collaborative search system.

When the mobile terminal receives the authorization agreement, the user reads the authorization agreement. If the user agrees on the authorization agreement, the user signs the authorization agreement through the mobile terminal, so as to indicate that the collaborative search system is authorized to obtain the relationship list. For example, the user can sign the authorization agreement in a digital signature way through the mobile terminal.

At step s3100, the collaborative search system receives a search request from the mobile terminal.

The search request contains a query word of the user. Furthermore, the search request also contains an identifier of the mobile terminal. For example, the identifier of the mobile terminal can be a mobile phone number of the mobile terminal.

At step s3200, the collaborative search system makes a search based on the search request to obtain search results.

At step s3300, the collaborative search system obtains a relationship list associated with the identifier of the mobile terminal.

In an example, the mobile terminal sends a contact list and/or call records stored in the mobile terminal to the collaborative search system. For example, the mobile terminal sends a contact list and/or call records stored in the mobile terminal to the collaborative search system while sending the search request. The collaborative search system obtains the contact list and/or call records as a relationship list associated with the identifier of the mobile terminal.

In another example, the collaborative search system first extracts the identifier of the mobile terminal from the search request of the mobile terminal. Then, the collaborative search system sends the extracted identifier to a telecommunication service operator server. The telecommunication service operator server retrieves the call records of the mobile terminal based on the identifier, and sends the call records of the mobile terminal to the collaborative search system. The collaborative search system obtains the call records as a relationship list associated with the identifier of the mobile terminal.

It will be appreciated by a person skilled in the art that the collaborative search system can obtain the relationship list by using either and/or both of the ways in the above examples.

Further, the collaborative search system can store the relationship list, and update the relationship list each time when obtaining the relationship list from a mobile terminal and/or a telecommunication service operator.

Further, the collaborative search system can request a mobile terminal to send its relationship list to the collaborative search system at a predetermined time interval (for example, one week, one month and so on), so as to update the relationship list stored in the collaborative search system.

At step s3400, the collaborative search system obtains search history information associated with members in the relationship list based on the relationship list.

The collaborative search system contains a search history information repository for storing search history information associated with identifiers. The collaborative search system obtains the search history information from the search history information repository based on the identifiers in the obtained relationship list.

At step s3500, the collaborative search system ranks the search results based on the search history information. For example, if there is a same item in the search results as that in the search history information, this item will be ranked higher in the ranking.

At step s3600, the collaborative search system provides the ranked search results to the mobile terminal.

At step s3700, the collaborative search system receives selections that the mobile terminal makes on the search results.

At step s3800, the collaborative search system stores, in the search history information repository, the selections that the mobile terminal makes on the search results, as the search history information for later use.

Figure 4:
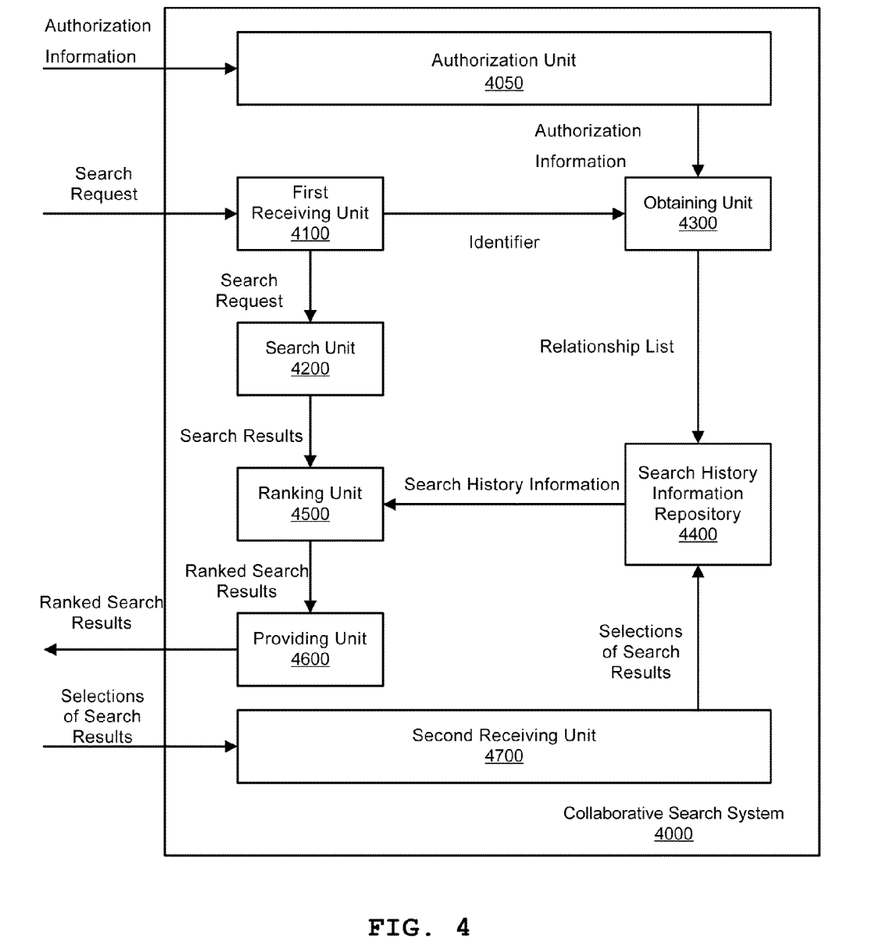
FIG. 4 is a block diagram showing a collaborative search system according to an embodiment of the invention.

FIG. 4 is a block diagram showing a collaborative search system 4000 according to an embodiment of the invention.

The collaborative search system 4000 comprises: an authorization unit 4050, a first receiving unit 4100, a search unit 4200, an obtaining unit 4300, a search history information repository 4400, a ranking unit 4500, a providing unit 4600 and a second receiving unit 4700.

The authorization unit 4050 obtains an authorization for accessing a relationship list of a mobile terminal. The mobile terminal is, for example, a mobile phone, PDA, iPhone™ and so on.

In an example, the collaborative search system merely needs the relationship list from the mobile terminal. Thus, it is merely necessary for the authorization unit 4050 to obtain an authorization for accessing the relationship list in the mobile terminal, from the mobile terminal (or its user).

In another example, the collaborative search system needs a relationship list from a telecommunication service operator. In this case, the authorization unit 4050 obtains an authorization from the mobile terminal (or its user) so as to be able to obtain the relationship list from the telecommunication service operator.

For example, the user of the mobile terminal can go to the business hall of the collaborative search system to sign an authorization agreement to authorize the collaborative search system to access its relationship list.

Alternatively, for example, when a user applies for a collaborative search service through a mobile terminal, the authorization unit 4050 sends an authorization agreement to the mobile terminal. For example, the authorization agreement can be digitally signed by the authorization unit 4050.

When the mobile terminal receives the authorization agreement, the user reads the authorization agreement. If the user agrees on the authorization agreement, the user signs the authorization agreement through the mobile terminal, so as to indicate that the collaborative search system is authorized to obtain the relationship list. For example, the user can sign the authorization agreement in a digital signature way through the mobile terminal.

The first receiving unit 4100 receives a search request from the mobile terminal.

The search request contains a query word of the user. Furthermore, the search request also contains an identifier of the mobile terminal. For example, the identifier of the mobile terminal can be a mobile phone number of the mobile terminal.

The search unit 4200 makes a search based on the search request to obtain search results.

The obtaining unit 4300 obtains a relationship list associated with the identifier of the mobile terminal.

In an example, the mobile terminal sends a contact list and/or call records stored in the mobile terminal to the collaborative search system. For example, the mobile terminal sends a contact list and/or call records stored in the mobile terminal to the collaborative search system while sending the search request. The obtaining unit 4300 obtains the contact list and/or call records as a relationship list associated with the identifier of the mobile terminal.

In another example, the obtaining unit 4300 first extracts the identifier of the mobile terminal from the search request of the mobile terminal. Then, the obtaining unit 4300 sends the extracted identifier to a telecommunication service operator server. The telecommunication service operator server retrieves the call records of the mobile terminal based on the identifier, and sends the call records of the mobile terminal to the obtaining unit 4300. The obtaining unit 4300 obtains the call records as a relationship list associated with the identifier of the mobile terminal.

It will be appreciated by a person skilled in the art that the obtaining unit 4300 can obtain the relationship list by using either and/or both of the ways in the above examples.

Further, the obtaining unit 4300 can store the relationship list, and update the relationship list each time when obtaining the relationship list from a mobile terminal and/or a telecommunication service operator.

Further, the obtaining unit 4300 can request a mobile terminal to send its relationship list to the obtaining unit 4300 at a predetermined time interval (for example, one week, one month and so on), so as to update the relationship list stored in the obtaining unit 4300.

The search history information repository 4400 obtains search history information associated with members in the relationship list based on the relationship list.

The search history information repository 4400 contains a search history information repository for storing search history information associated with identifiers. The search history information repository 4400 obtains the search history information from the search history information repository based on the identifiers in the obtained relationship list.

The ranking unit 4500 receives the search history information from the search history information repository 4400. The ranking unit 4500 ranks the search results based on the received search history information. For example, if there is a same item in the search results as that in the search history information, this item will be ranked higher in the ranking.

The providing unit 4600 provides the ranked search results to the mobile terminal.

The second receiving unit 4700 receives selections that the mobile terminal makes on the search results and sends them to the search history information repository 4400.

The search history information repository 4400 stores the selections that the mobile terminal makes on the search results, as the search history information for later use.

Below, the specific examples of an embodiment of the invention will be described with reference to FIGS. 5 and 6. It will be appreciated by a person skilled in the art that the examples are merely illustrative and will not limit the invention in any way.

Figure 5:
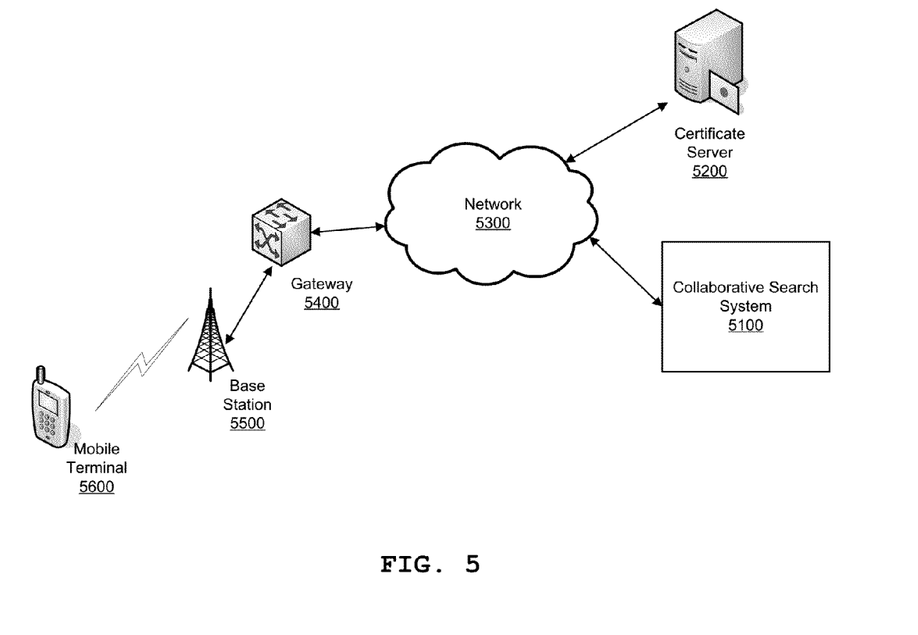
FIG. 5 is a diagram showing a first example according to an embodiment of the invention.

FIG. 5 is a diagram showing a first example according to an embodiment of the invention.

As shown in FIG. 5, a collaborative search system 5100 according to an embodiment of the invention is connected with a network 5300. A certificate server 5200 is connected with the network 5300 and is used to distribute a digital certificate. A mobile terminal 5600 is connected with the network 5300 via a base station 5500 and a gateway 5400.

In the first example, a user accesses the collaborative search system 5100 according to an embodiment of the invention through the mobile terminal 5600, and uses the search service provided by the collaborative search system 5100. The mobile terminal is, for example, a mobile phone, PDA, iPhone™ and so on.

First, the user authorizes the collaborative search system 5100 to access its relationship list. For example, the relationship list contains the contact list and/or call records stored in the mobile terminal 5600.

As described above, for example, the user can go to the business hall of the collaborative search system 5100 to sign an authorization agreement to authorize the collaborative search system 5100 to access its relationship list.

Alternatively, the user may otherwise authorize the collaborative search system 5100 to access its relationship list through the mobile terminal 5600.

For example, the user clicks the website of the collaborative search system 5100 though the mobile terminal 5600 to access it. If it is the first time that the user accesses the collaborative search system 5100, the collaborative search system 5100 sends an authorization agreement and a client program to the mobile terminal 5600.

For example, the collaborative search system 5100 may first obtain a digital certificate from the certificate server 5200, and then, digitally signs the authorization agreement by using the digital certificate. For example, the certificate server 5200 may be a server of the digital certificate authority Verisign and so on. The technique of signing with the digital certificate is well known in the prior art, and thus it is unnecessary to explain it in detail here.

The client program is used to provide the identifier and relationship list of the mobile terminal (user) when the user uses the search service provided by the collaborative search system 5100. For example, the client program can be an API interface program. For example, the identifier is a mobile phone number of the mobile terminal.

The user reads the authorization agreement through the mobile terminal 5600. If the user accepts the authorization agreement, then the client program will be installed in the mobile terminal. For example, the user can sign the authorization agreement by its private digital certificate, so as to indicate that the authorization agreement is accepted. Further, the mobile terminal 5600 can return the signed agreement to the collaborative search system 5100.

Then, the user can use the search service provided by the collaborative search system 5100 through the mobile terminal 5600.

The user opens a browser on the mobile terminal 5600, and visits the website of the collaborative search system 5100.

For example, the user enters a query word "java xml" in the web page of the collaborative search system 5100 and clicks search.

The browser on the mobile terminal 5600 obtains the identifier and relationship list of the mobile terminal (user) through the client program (for example, an API interface program on a mobile phone). The relationship list is, for example, the contact list in the address book stored in the mobile terminal and/or the call records of the user stored in the mobile terminal.

The browser on the mobile terminal 5600 sends a search request to the collaborative search system 5100. The browser can write the identifier and the relationship list of the user into the http header of the search request. Below shows an example of the http header of the search request:

GET
/search?hl=zh−CN&q=java+xml&btnG=Google+%E6%90%9C%E7%B4%A2&meta=HTTP/1.1
Host: www.google.cn
User-Agent: Mozilla/5.0 (Windows; U; Windows NT 5.1; en-US; rv:1.8.1.16) Gecko/20080702 Firefox/2.0.0.16
Accept:
text/xml,application/xml,application/xhtml+xml,text/html;q=0.9,text/plain;q=0.8,image/png,*/*;q=0.5
Accept-Language: en-us,en;q=0.5
Accept-Encoding: gzip,deflate
Accept-Charset: ISO-8859-1,utf-8;q=0.7,*;q=0.7

Keep-Alive: 300
Connection: keep-alive
Referer: http://www.google.cn/webhp?source=g_cn
SEARCH_USER_IDENTITY: 13200299292
SEARCH_USER_CONTACTS: Colleague (13310929353); Classmate (13387469353; 13329383353); Family (13187683353)

As shown above, the field "SEARCH_USER_IDEN-TITY" indicates the identifier of the-user and is a mobile phone number "13200299292" here. The field "SEARCH_USER_CONTACTS" indicates the relationship list of the user and is a contact list "Colleague (13310929353); Classmate (13387469353; 13329383353); Family (13187683353)" here.

The mobile terminal 5600 sends the search request to the collaborative search system 5100 via the base station 5500, the gateway 5400 and the network 5300.

On the one hand, the collaborative search system 5100 makes a search based on the search request to obtain search results.

On the other hand, the collaborative search system 5100 obtains the relationship list from the search request and obtains search history information associated with members in the relationship list based on the relationship list.

The search history information contains records of the user's searching behaviors. For example, the typical searching behaviors of users include "the user clicks a document in the search results and views it".

Table 1 shows an example of the searching history information as an example.

TABLE 1

| Identifier | Query words | Searching behavior | Document number | Timestamp |
|---|---|---|---|---|
| 13310929353 | Java xml | Clicking search result | 23 | 2008-08-06 T12:00:00:000Z |
| 13387469353 | Java xml | Clicking search result | 23 | 2008-08-05 T12:00:00:000Z |
| 13310929353 | Beijing, Hotel | Clicking search result | 78 | 2008-08-05 T11:00:00:000Z |
| 13329383353 | Java xml | Clicking search result | 23 | 2008-08-05 T11:00:00:000Z |
| 13039383353 | Java xml | Clicking search result | 56 | 2008-08-08 T11:00:00:000Z |
| 13187683353 | Cinema | Clicking search result | 89 | 2008-08-08 T11:00:00:000Z |
| 13928683353 | Java xml | Clicking search result | 75 | 2008-08-08 T11:00:00:000Z |

For example, Table 1 stores the search history information of 7 users. Table 1 contains a field "Identifier", "Query words", "Searching behavior", "Document number" and "Timestamp".

The collaborative search system re-ranks the search results based on the obtained search history information, i.e. executes a collaborative search ranking. In the collaborative search ranking, the search history information of the users that are associated with the current user will affect the ranking of search result returned to the current user.

Below, a simple algorithm for the collaborative search ranking will be described with reference to Table 1.

For example, the identifier of the current user is 13200299292, and the query word is "java xml".

At a first step, the collaborative search system 5100 retrieves all the documents associated with the query word.

At a second step, the collaborative search system 5100 finds out the searching behaviors of all the users in the relationship list of the user that are associated with the current query word. The collaborative search system 5100 finds out the numbers of the documents that are subject to "clicking search result", based on the searching behaviors of these users.

For example, the relationship list of the current user obtained by the collaborative search system 5100 is:
"Colleague": 13310929353,
"Classmate": 13387469353,
"Classmate": 13329383353.

According to Table 1, the search behaviors of the above 3 users can be known, i.e. for the query word "java xml", the document with document number of 3 is clicked 3 times.

At a third step, the collaborative search system 5100 re-ranks the document numbers retrieved in the first step based on the clicking times of the documents being clicked.

In the re-ranking, the influences of the clicking times on the ranks of all the documents retrieved in the first step are taken into consideration. According to the prior art, every document retrieved in the first step has a score value, and the ranks of the documents are determined according to the score values. In the collaborative search system 5100 according to an embodiment of the invention, the score value S' of each document can be re-calculated from the following formula:

$$S' = S \times (e/2)^n \quad \text{(Formula 1)}$$

where S is an original score value, e indicates the exponential, and n is the clicking times for which the document is clicked by the users in the relationship list of the current user.

In this example, the document with a document number of 23 is clicked 3 times, and thus, the score value thereof becomes $(e/2)^3$ times larger than the original score value S. In this way, the rank of the document with the document number of 23 can be accordingly improved.

Then, the collaborative search system 5100 returns the re-ranked search results to the mobile terminal 5600. For example, the collaborative search system 5100 returns 10 search results to the mobile terminal 5600 each time.

The collaborative search system 5100 records the searching behaviors of the user. For example, the user clicks and views the fourth document in the first page of the search results, whose document number is 23. The clicking result of the user is returned to the collaborative search system 5100. The collaborative search system 5100 records the returned clicking result, for example, it adds a new record in its search history information repository:

TABLE 2

| Identifier | Query words | Searching behavior | Document number | Timestamp |
|---|---|---|---|---|
| 13200299292 | Java xml | Clicking search result | 23 | 2008-08-09 T12:00:00:000Z |

This new record can be used for the searches of other users.

It will be appreciated by a person skilled in the art that the above simple algorithm for the collaborative search ranking is merely illustrative and should not be a limit to the present invention. Many other ways for re-ranking the search results by using the search history information are apparent to a person skilled in the art.

Figure 6:
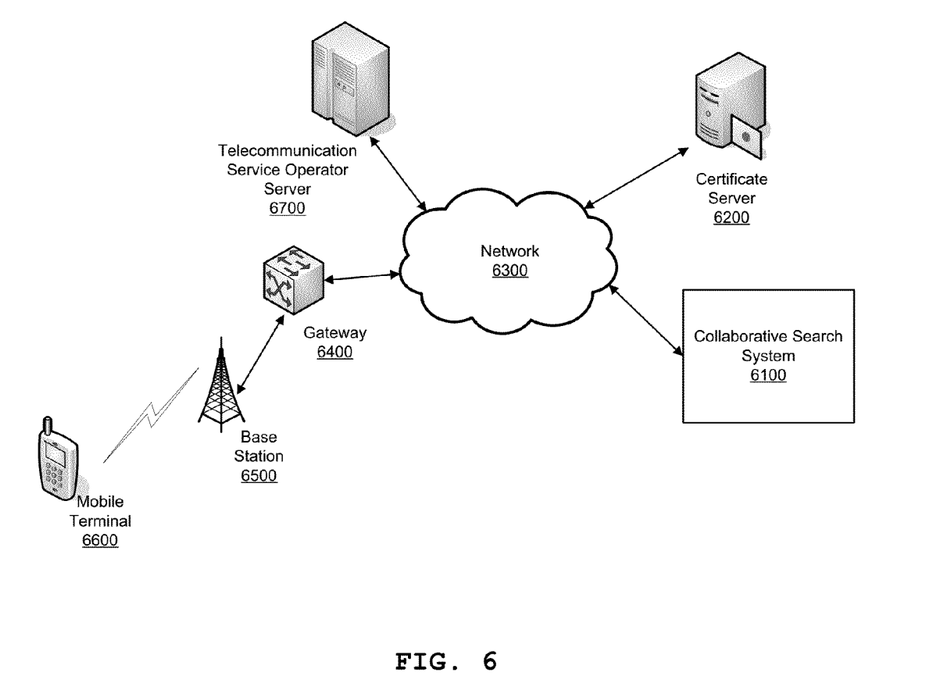
FIG. 6 is a diagram showing a second example according to an embodiment of the invention.

FIG. 6 is a diagram showing a second example according to an embodiment of the invention.

As shown in FIG. 6, a collaborative search system 6100 according to an embodiment of the invention is connected with a network 6300. A certificate server 6200 is connected with the network 6300 and is used to distribute a digital certificate. A mobile terminal 6600 is connected with the network 6300 via a base station 6500 and a gateway 6400. A telecommunication service operator server 6700 is connected with the network 6300.

In the second example, a user accesses the collaborative search system 6100 according to an embodiment of the invention through the mobile terminal 6600, and uses the search service provided by the collaborative search system 6100. The mobile terminal is, for example, a mobile phone, PDA, iPhone™ and so on.

First, the user authorizes the collaborative search system 6100 to access its relationship list. The difference between the first example and the second example lies in that the relationship list contains the call records stored in the telecommunication service operator server 6700.

As described above, for example, the user can go to the business hall of the collaborative search system 6100 to sign an authorization agreement to authorize the collaborative search system 6100 to obtain its relationship list from the telecommunication service operator server 6700.

Alternatively, the user may otherwise authorize the collaborative search system 6100 to obtain its relationship list from the telecommunication service operator server 6700, through the mobile terminal 6600.

For example, the user clicks the website of the collaborative search system 6100 through the mobile terminal 6600 to access it. If it is the first time that the user accesses the collaborative search system 6100, the collaborative search system 6100 sends an authorization agreement and a client program to the mobile terminal 6600.

For example, the collaborative search system 6100 may first obtain a digital certificate from the certificate server 6200, and then, digitally signs the authorization agreement by using the digital certificate. For example, the certificate server 6200 may be a server of the digital certificate authority Verisign and so on. The technique of signing with the digital certificate is well known in the prior art, and thus it is unnecessary to explain it in detail here.

The client program is used to provide the identifier of the mobile terminal (user) when the user uses the search service provided by the collaborative search system 6100. For example, the client program can be an API interface program. For example, the identifier is a mobile phone number of the mobile terminal.

The user reads the authorization agreement through the mobile terminal 6600. If the user accepts the authorization agreement, then the client program will be installed in the mobile terminal. For example, the user can sign the authorization agreement by its private digital certificate, so as to indicate that the authorization agreement is accepted. Further, the mobile terminal 6600 can return the signed agreement to the collaborative search system 6100.

The collaborative search system 6100 sends the agreement signed by the user to the telecommunication service operator server 6700, so as to be able to obtain the relationship list of the user from the telecommunication service operator server 6700 when searching.

Then, the user can use the search service provided by the collaborative search system 6100 through the mobile terminal 6600.

The user opens a browser on the mobile terminal 6600, and visits the website of the collaborative search system 6100. For example, the user enters a query word "java xml" in the web page of the collaborative search system 6100 and clicks search.

The browser on the mobile terminal 6600 obtains the identifier of the mobile terminal (user) through the client program (for example, an API interface program on a mobile phone).

The browser on the mobile terminal 6600 sends a search request to the collaborative search system 6100. The browser can write the identifier of the user into the http header of the search request. Below shows an example of the http header of the search request:
GET
/search?hl=zh–CN&q=java+xml&btnG=Google+%E6%90%9C%E7%B4%A2&met a=HTTP/1.1
Host: www.google.cn
User-Agent: Mozilla/5.0 (Windows; U; Windows NT 5.1; en-US; rv:1.8.1.16) Gecko/20080702 Firefox/2.0.0.16
Accept: text/xml,application/xml,application/xhtml+xml,text/html; q=0.9,text/plain;q=0.8,image/png,*/*;q=0.5
Accept-Language: en-us,en;q=0.5
Accept-Encoding: gzip,deflate
Accept-Charset: ISO-8859-1,utf-8;q=0.7,*;q=0.7
Keep-Alive: 300
Connection: keep-alive
Referer: http://www.google.cn/webhp?source=g_cn
SEARCH_USER_IDENTITY: 13200299292

As shown above, the field "SEARCH_USER_IDENTITY" indicates the identifier of the-user and is a mobile phone number "13200299292" here.

The mobile terminal 6600 sends the search request to the collaborative search system 6100 via the base station 6500, the gateway 6400 and the network 6300.

On the one hand, the collaborative search system 6100 makes a search based on the search request to obtain search results.

On the other hand, the collaborative search system 6100 obtains the identifier from the search request, and sends the identifier to the telecommunication service operator server 6700 to request it to provide the relationship list of this user.

The telecommunication service operator server 6700 receives the identifier and judges whether or not the collaborative search system 6100 has an authorization for accessing the relationship list of the mobile terminal. For example, the telecommunication service operator server 6700 checks whether or not there exists an authorization agreement that authorizes the collaborative search system 6100 to access the relationship list of the mobile terminal.

If there exists such an authorization agreement, the telecommunication service operator server 6700 retrieves the call records of the mobile terminal based on the identifier and sends the call records of the mobile terminal to the collaborative search system 6100.

The collaborative search system 6100 receives the call records as the relationship list associated with the identifier.

The collaborative search system 6100 obtains search history information associated with members in the relationship list based on the relationship list.

The collaborative search system 6100 re-ranks the search results based on the search history information. The subsequent steps are the same as those in the first example, and thus, it is unnecessary to describe them once more.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is has been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although some specific embodiments of the present invention have been demonstrated in detail with examples, it should be understood by a person skilled in the art that the above examples are only intended to be illustrative but not to limit the scope of the present invention. It should be understood by a person skilled in the art that the above embodiments can be modified without departing from the scope of the present invention. The scope of the present invention is defined by the attached claims.

What is claimed is:

1. A computer-implemented collaborative search method, comprising:
   receiving a search request of a mobile terminal;
   searching based on the search request to obtain search results;
   obtaining access authorization for accessing a relationship list, wherein the relationship list is associated with an identifier of the mobile terminal;
   obtaining search history information associated with members in the relationship list based on the relationship list; and
   ranking the search results based on the search history information.

2. The method according to claim 1, wherein the obtaining an access authorization for accessing the relationship list further comprises:
   obtaining the access authorization for accessing the relationship list based on a digital signature way.

3. The method according to claim 1, wherein the identifier of the mobile terminal is a mobile phone number of the mobile terminal.

4. The method according to claim 1, wherein the relationship list is at least one of a contact list and call records stored in the mobile terminal.

5. The method according to claim 4, wherein the relationship list is obtained from a telecommunication service operator based on the identifier.

6. The method according to claim 5, wherein the relationship list contains the call records.

7. The method according to claim 1, further comprising:
providing the ranked search results to the mobile terminal;
receiving selections of the search results of the mobile terminal; and
storing the selections of the search results of the mobile terminal as the search history information.

8. A collaborative search system, comprising:
a processor;
a first receiving unit for receiving a search request of a mobile terminal;
a search unit for searching based on the search request to obtain search results;
an authorization unit for obtaining access authorization for accessing a relationship list, wherein the relationship list is associated with an identifier of the mobile terminal;
a search history information repository for storing search history information; and
a ranking unit for obtaining search history information associated with members in the relationship list based on the relationship list, and ranking the search results based on the search history information.

9. The collaborative search system according to claim 8, wherein the authorization unit is configured to obtain the access authorization for accessing the relationship list based on a digital signature way.

10. The collaborative search system according to claim 8, wherein the identifier of the mobile terminal is a mobile phone number of the mobile terminal.

11. The collaborative search system according to claim 8, wherein the relationship list contains at least one of a contact list and call records stored in the mobile terminal.

12. The collaborative search system according to claim 11, wherein the relationship list is obtained from a telecommunication service operator based on the identifier.

13. The collaborative search system according to claim 12, wherein the relationship list contains the call records.

14. The collaborative search system according to claim 8, further comprising:
a providing unit for providing the ranked search results to the mobile terminal;
a second receiving unit for receiving selections of the search results of the mobile terminal,
wherein the search history information repository is configured to store the selections of the search results of the mobile terminal as the search history information.

15. A computer program product for collaborative search, the computer program product, comprising:
a non-transitory computer usable medium having computer usable program code embodied therewith, the computer usable program code comprising:
computer usable program code configured to receive a search request of a mobile terminal;
computer usable program code configured to search based on the search request to obtain search results;
computer usable program code configured to obtain an access authorization for accessing a relationship list, wherein the relationship list is associated with an identifier of the mobile terminal;
computer usable program code configured to obtain search history information associated with members in the relationship list based on the relationship list; and
computer usable program code configured to rank the search results based on the search history information.

16. The computer program product according to claim 15, wherein the computer usable program code configured to obtain an authorization for accessing the relationship list further comprises: computer usable program code configured to obtain the access authorization for accessing the relationship list based on a digital signature way.

17. The computer program product according to claim 15, wherein the identifier of the mobile terminal is a mobile phone number of the mobile terminal.

18. The computer program product according to claim 15, wherein the relationship list is at least one of a contact list and call records stored in the mobile terminal.

* * * * *